(12) United States Patent
Bellman et al.

(10) Patent No.: US 10,618,839 B2
(45) Date of Patent: Apr. 14, 2020

(54) LOW EMISSIVITY COATINGS WITH INCREASED ULTRAVIOLET TRANSMISSIVITY

(71) Applicant: Corning Incorporated, Corning, NY (US)

(72) Inventors: Robert Alan Bellman, Painted Post, NY (US); Karl William Koch, III, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 119 days.

(21) Appl. No.: 15/827,256

(22) Filed: Nov. 30, 2017

(65) Prior Publication Data

US 2018/0148372 A1   May 31, 2018

Related U.S. Application Data

(60) Provisional application No. 62/428,264, filed on Nov. 30, 2016.

(51) Int. Cl.
| | | |
|---|---|---|
| *B32B 15/04* | (2006.01) | |
| *B32B 17/06* | (2006.01) | |
| *C03C 17/36* | (2006.01) | |
| *G02B 5/28* | (2006.01) | |
| *E06B 3/67* | (2006.01) | |
| *G02B 1/10* | (2015.01) | |

(52) U.S. Cl.
CPC ........... *C03C 17/366* (2013.01); *C03C 17/36* (2013.01); *C03C 17/3626* (2013.01); *C03C 17/3639* (2013.01); *C03C 17/3644* (2013.01); *C03C 17/3649* (2013.01); *C03C 17/3652* (2013.01); *C03C 17/3681* (2013.01); *G02B 5/282* (2013.01); *G02B 5/283* (2013.01); *C03C 2217/216* (2013.01); *C03C 2217/256* (2013.01); *C03C 2217/258* (2013.01); *C03C 2217/281* (2013.01); *C03C 2218/156* (2013.01); *E06B 3/6715* (2013.01); *G02B 1/10* (2013.01)

(58) Field of Classification Search
USPC ............... 428/426, 428, 432, 434, 688, 433
See application file for complete search history.

(56) References Cited

U.S. PATENT DOCUMENTS

| | | |
|---|---|---|
| 2,444,976 A | 7/1948 | Brown |
| 3,406,085 A | 10/1968 | Brown et al. |
| 3,957,498 A | 5/1976 | Reade |
| 4,148,661 A | 4/1979 | Kerko et al. |
| 4,222,781 A | 9/1980 | Morse et al. |
| 4,251,278 A | 2/1981 | Hares |
| 4,390,635 A | 6/1983 | Morgan |
| 5,023,209 A | 6/1991 | Grateau et al. |
| 5,128,799 A | 4/1992 | Byker |
| 5,256,601 A | 10/1993 | Kerko et al. |
| 5,285,077 A | 2/1994 | Hales |
| 5,481,395 A | 1/1996 | Byker |

(Continued)

FOREIGN PATENT DOCUMENTS

| | | |
|---|---|---|
| CN | 204002374 U | 12/2014 |
| WO | 2015051618 A1 | 4/2015 |

*Primary Examiner* — Lauren R Colgan

(57) ABSTRACT

A coated article including a substrate and a low emissivity coating. The coated article includes increased $T_{UV}$ and/or actinic transmissivity for use in windows and similar applications.

8 Claims, 8 Drawing Sheets

(56) References Cited

U.S. PATENT DOCUMENTS

| | | |
|---|---|---|
| 5,525,430 A | 6/1996 | Chahroudi |
| 5,751,467 A | 5/1998 | Byker |
| 5,790,298 A | 8/1998 | Tonar |
| 5,801,873 A | 9/1998 | Byker |
| 6,094,290 A | 7/2000 | Crawford et al. |
| 6,413,643 B1 | 7/2002 | Kunisada et al. |
| 6,632,491 B1 * | 10/2003 | Thomsen .............. C03C 17/36 156/109 |
| 7,278,241 B2 | 10/2007 | Wirawan |
| 7,940,457 B2 | 5/2011 | Jain et al. |
| 8,154,788 B2 | 4/2012 | Millett et al. |
| 8,409,663 B2 * | 4/2013 | Varaprasad .......... C03C 17/256 427/160 |
| 8,427,742 B2 | 4/2013 | Kim et al. |
| 8,441,707 B2 | 5/2013 | Lam et al. |
| 9,234,382 B2 | 1/2016 | Bouesnard et al. |
| 9,272,949 B2 * | 3/2016 | Varaprasad .......... C03C 17/002 |
| 2005/0196626 A1 | 9/2005 | Knox et al. |
| 2006/0023160 A1 | 2/2006 | Cartier et al. |
| 2006/0090834 A1 | 5/2006 | Huang et al. |
| 2007/0243391 A1 * | 10/2007 | Varaprasad .............. C03C 17/36 428/426 |
| 2008/0014448 A1 * | 1/2008 | Lu ........................ C03C 17/225 428/432 |
| 2009/0297806 A1 | 12/2009 | Dawson-Elli et al. |
| 2011/0133672 A1 | 6/2011 | Tsang et al. |
| 2011/0206873 A1 | 8/2011 | Showers |
| 2012/0064265 A1 | 3/2012 | Suh et al. |
| 2012/0154906 A1 | 6/2012 | Tatapudy |
| 2013/0286461 A1 | 10/2013 | Broekhuis et al. |
| 2014/0063582 A1 | 3/2014 | Gross et al. |
| 2014/0151613 A1 | 6/2014 | Brocheton |
| 2014/0327949 A1 | 11/2014 | Gross et al. |
| 2015/0099130 A1 | 4/2015 | Mauro et al. |
| 2015/0362646 A1 | 12/2015 | Lim |
| 2016/0085131 A1 | 3/2016 | Lam et al. |

* cited by examiner

| 1931 CIE | 0/20/34 nm | 10/20/34 nm | 20/20/34 nm | 30/20/34 nm | 40/20/34 nm | 50/20/34 nm |
|---|---|---|---|---|---|---|
| Rx | 0.369 | 0.387 | 0.427 | 0.474 | 0.441 | 0.38 |
| Ry | 0.301 | 0.3 | 0.31 | 0.324 | 0.307 | 0.29 |
| Tx | 0.31 | 0.319 | 0.317 | 0.317 | 0.32 | 0.324 |
| Ty | 0.344 | 0.34 | 0.336 | 0.333 | 0.335 | 0.341 |
| TL | 72 | 77.6 | 83.3 | 87.1 | 87.6 | 84.5 |

| 1931 CIE | 0 nm | 20 nm | 34 nm | 40 nm | 60 nm |
|---|---|---|---|---|---|
| Rx | 0.368 | 0.457 | 0.369 | 0.313 | 0.304 |
| Ry | 0.363 | 0.423 | 0.301 | 0.275 | 0.315 |
| Tx | 0.285 | 0.281 | 0.31 | 0.34 | 0.366 |
| Ty | 0.293 | 0.296 | 0.344 | 0.358 | 0.355 |
| TL | 35 | 59 | 72 | 70.1 | 45.7 |

| 1931 CIE | TiO2 | 2% AZO | SiNx | ZnO |
|---|---|---|---|---|
| Rx | 0.474 | 0.45 | 0.453 | 0.468 |
| Ry | 0.324 | 0.384 | 0.378 | 0.359 |
| Tx | 0.317 | 0.398 | 0.306 | 0.31 |
| Ty | 0.333 | 0.318 | 0.323 | 0.328 |
| TL | 87.1 | 69.6 | 76.3 | 81.45 |
| T375nm | 11.37 | 6.56 | 5.66 | 3.03 |

| 1931 CIE | 0nm | 20nm | 30nm | 40nm | 50nm | 60nm |
|---|---|---|---|---|---|---|
| Rx | 0.336 | 0.295 | 0.289 | 0.29 | 0.304 | 0.335 |
| Ry | 0.267 | 0.267 | 0.273 | 0.284 | 0.301 | 0.311 |
| Tx | 0.33 | 0.338 | 0.338 | 0.336 | 0.333 | 0.33 |
| Ty | 0.343 | 0.345 | 0.343 | 0.339 | 0.336 | 0.334 |
| TL | 84.4 | 81.8 | 82.9 | 84 | 86.5 | 89.3 |
| T375nm | 6.96 | 4.21 | 5.53 | 11.26 | 46.76 | 43.96 |

| 1931 CIE | 60 nm | 50 nm | 40nm | 20nm | 0nm |
|---|---|---|---|---|---|
| Rx | 0.255 | 0.261 | 0.26 | 0.275 | 0.432 |
| Ry | 0.332 | 0.274 | 0.254 | 0.242 | 0.306 |
| Tx | 0.337 | 0.338 | 0.34 | 0.34 | 0.319 |
| Ty | 0.333 | 0.338 | 0.343 | 0.348 | 0.335 |
| TL | 89.3 | 88.5 | 86.5 | 84.3 | 85.5 |
| T375nm | 90.91 | 67.34 | 54.70 | 4.62 | 9.84 |

LOW EMISSIVITY COATINGS WITH INCREASED ULTRAVIOLET TRANSMISSIVITY

This application claims the benefit of priority under 35 U.S.C. § 119 of U.S. Provisional Application Ser. No. 62/428,264, filed on Nov. 30, 2016, the contents of which are relied upon and incorporated herein by reference in their entirety.

BACKGROUND

Field

The present disclosure relates generally to low emissivity coatings with improved ultraviolet (UV) wavelength transmissivity for use in architectural windows and related applications.

Technical Background

Conventional architectural windows are comprised of single and multi-pane units. That is, windows have one or more glass panes used to insulate the inside of a structure from the outdoor temperature and infrared (IR) and near infrared (NIR) wavelengths. One or more of these glass panes sometimes include low emissivity coatings (or "low e" coatings) to reflect IR and NIR wavelengths from the solar spectrum and thereby reduce radiant thermal energy transfer through the window.

Low emissivity coatings are also typically designed to or inherently reflect a portion or all of the UV wavelengths from the solar spectrum. However, increased UV transmission ($T_{UV}$) through low emissivity coatings may be desirable in windows that include UV reactive or sensitive glass. After all, UV reactive glass may be activated (or darkened) by exposure to UV wavelengths and could enable passively darkening windows, or variable visible wavelength transmission (Tvis), in response to increased solar and UV light intensity. Conventional low emissivity coatings on an outer pane of a window that reflect a portion of all of the UV wavelengths from the solar spectrum do not allow for activation or darkening of UV reactive glass internal to the low-e coating in a window. That is, conventional low emissivity coatings reflect too much of the UV light in the solar spectrum to effectively activate or darken UV reactive glass arranged behind the low emissivity coating with respect to impinging solar radiation.

Accordingly, a need exists for low emissivity coatings with improved UV transmission ($T_{UV}$) properties.

SUMMARY

According to embodiments of the present disclosure, a low emissivity coating is disclosed. In some embodiments, the low emissivity coating includes at least one dielectric layer and at least one metal layer. In some embodiments, the low emissivity coating is transmissive for long UV wavelengths or actinic wavelengths from the solar spectrum.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

DETAILED DESCRIPTION

Figure 1:
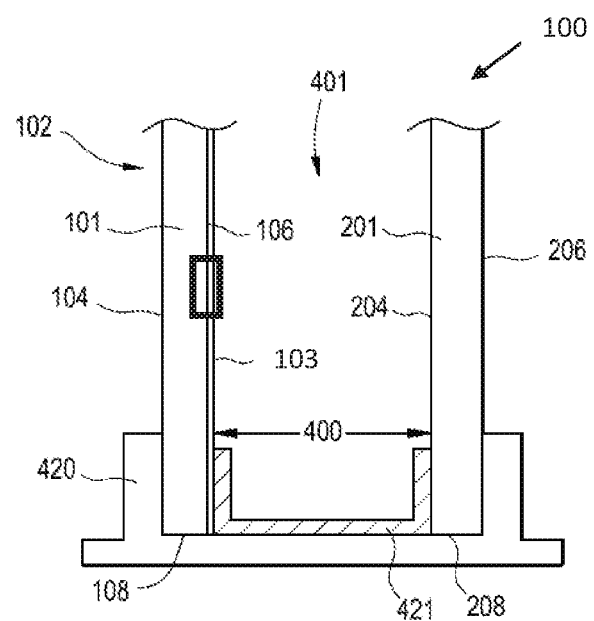
FIG. 1 is a cross-sectional view of the peripheral edge of a double-pane window including a coated article according to exemplary embodiments.
Figure 2:
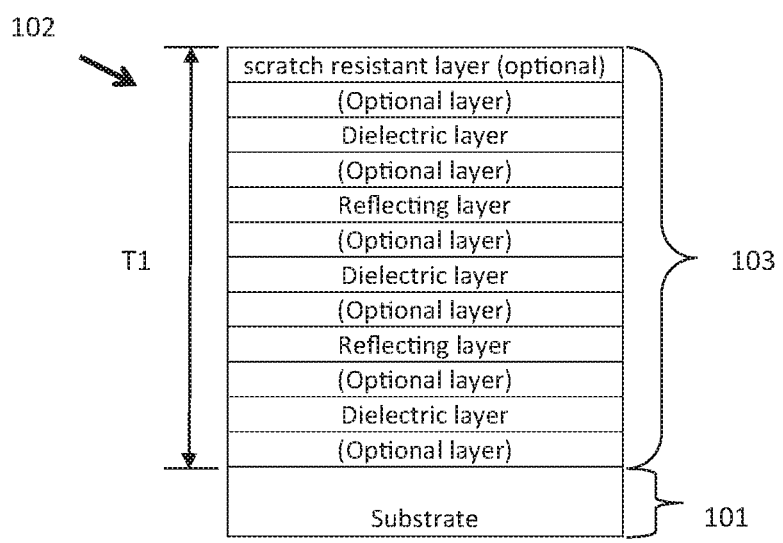
FIG. 2 is a cross-sectional view of an example coated article from FIG. 1 according to exemplary embodiments.
Figure 3:
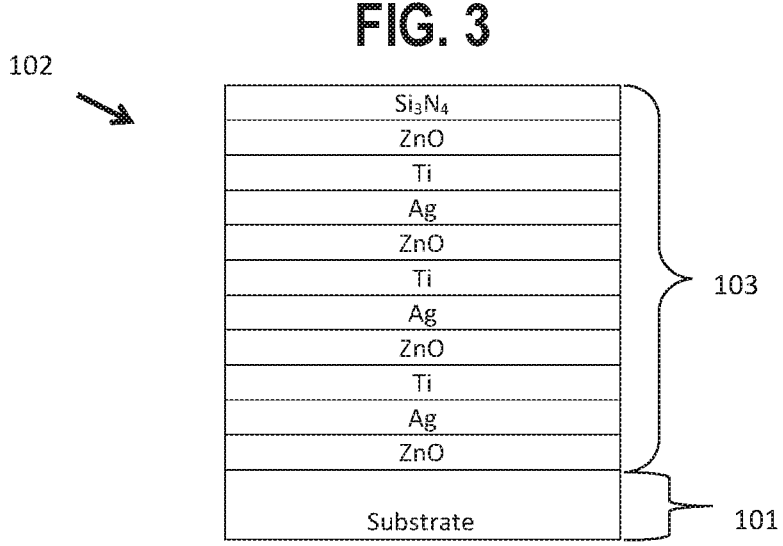
FIG. 3 is a cross-sectional view of another example coated article of FIG. 1 according to exemplar embodiments.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

The present disclosure provides a coated article 102 that can be used in applications such as insulating glass units (IGUs), single or multi-pane windows, glass doors, skylights, vehicle windows, and the like. In some embodiments, coated article 102 includes a substrate 101 and a low emissivity coating 103. In some embodiments, substrate 101 is a glass pane including opposite surfaces 104, 106 and at least one outer edge 108. Substrate 101 may have any combination of lateral dimensions, thicknesses, and shapes. Substrate 101 may be a glass, a ceramic, a glass-ceramic, a plastic, or any other substantially transparent material. In the case the substrate 101 is glass, the substrate 101 may have relatively large sizes ranging up to 3.21 m×6 m or 3.21 m×5.5 m or 3.21 m×5.10 m or 3.21 m×4.5 m (a "PLF" glass sheet) or 3.21 m×2.55 m or 3.21 m×2.25 m (a "DLF" glass sheet) for example. Glass substrate 101 may be made by any conventional glass manufacturing processes including float and slot draw. Example glass materials for substrate 101 include a soda-lime glass (low-iron or high-iron content), an aluminosilicate glass, a borosilicate glass, Pyrex®, quartz, an alkali-aluminosilicate glass, an alkali-borosilicate glass, an aluminoborosilicate glass, an alkali-aluminoborosilicate glass, or the like.

Referring to FIG. 1, an example double-pane window 100 includes the substrate 101 (e.g., the first substrate 101) and a second substrate 201. The first substrate 101 and the second substrate 201 are spaced apart by a volume 401 defined by a distance 400. Distance 400 may be maintained by a spacer 421 within a frame 420. In some embodiments, spacer 421 includes a material or coating configured to resist UV photo degradation. In some embodiments, the first substrate 101 and the second substrate 201 are substantially parallel. The second substrate 201 includes opposite surfaces 204, 206 and at least one outer edge 208. In some embodiments, the first substrate 101 includes low emissivity coating 103 on surface 106 such that low emissivity coating 103 is shielded from weather and other outdoor elements. Of course, one or both of the first and second substrates 101, 201 may include the low emissivity coating 103 on any one or a combination of its surfaces. Surface 104 of the first substrate 101 may be configured for the outside of an enclosure or building. In some embodiments, surface 104 is directly exposed to the outdoors, the elements, and solar radiation. In the embodiment depicted in FIG. 1, surfaces 106 and 204 are adjacent the volume 401 between the first and second substrates 101, 201. In some embodiments, surface 206 is directly exposed to the indoors of an enclosure or building. In some embodiments, surface 206 is configured for interaction with the inside of an enclosure or building including environmental controls therein. Double-pane window 100 may also include a third substrate, a fourth substrate, etc. and any number of low emissivity coatings 103 on any combination of said substrate surfaces.

The low emissivity coating 103 of the present disclosure includes a plurality of thin layers built up on the first substrate 101 to form the coated article 102. The individual layers of the low emissivity coating 103 may be applied to the first substrate 101 and built up via magnetron sputtering vapor deposition (MSVD), dip-coating, pyrolysis, spraying, sputtering, thermal or electron beam evaporation, chemical vapor deposition, and similar conventional processes. In some embodiments, the coated article 102 exhibits spectral selectivity such that it is highly transmissive for visible wavelengths (e.g., from about 400 nm to about 700 nm, or from about 400 nm to about 750 nm) and highly transmissive for long UV wavelengths (e.g., from about 320 nm to about 400 nm). In some embodiments, the coated article 102 exhibits spectral selectivity such that it is not highly transmissive for wavelengths other than from about 320 nm to about 700 nm. That is, in some embodiments, the coated article 102 is highly reflective for IR and NIR wavelengths (e.g., greater than about 700 nm, or about 750 nm) and highly reflective and/or absorbing for short UV wavelengths (e.g., below about 320 nm) in the solar spectrum. Wavelength(s) may be abbreviated as "λ" (i.e., Greek lambda) herein.

In some embodiments, the coated article 102 reflects and/or absorbs IR and NIR wavelengths from the solar electromagnetic spectrum. In some cases, reflection (Rsol) of IR and NIR wavelengths may be ≥90% of those in the solar spectrum, or even ≥95%. Absorption of IR and NIR wavelengths by the low emissivity coating 103 may be ≤5% of those included in the solar spectrum, or even less ≤1%. For example, the coated article 102 selectively reflects and/or absorbs light having a wavelength from about 700 nm to about 1 mm, or from about 701 nm to about 40000 nm, or from about 701 nm to about 2700 nm, or from about 751 nm to about 2700 nm, or from about 701 nm to about 2700 nm, or from about 751 nm to about 2000 nm, or from about 1000 nm to about 2000 nm. Selective reflection may include reflection of ≥80%, or even ≥95%, of NIR and IR wavelengths interacting with the low emissivity coating 103 from outside solar radiation. In some embodiments, the coated article 102 may transmit ≤20%, or even ≤5% of NIR and/or IR light contacting the coated article 102 (e.g., the outside glass pane). Percent transmittance by the coated article 102 may be calculated using the ISO 9050: 2003 Standard ("Glass in building—Determination of light transmittance, solar direct transmittance, total solar energy transmittance, ultraviolet transmittance, and related glazing factors), for example. Alternatively, percent transmittance may be calculated by other standards and codes adopted by the International Code Council (ICC) and/or using a monochromator.

Referring back to FIG. 1, selective reflection and/or absorption of IR and NIR wavelengths from the solar spectrum (from outdoors) by the coated article 102 minimizes heat transfer into volume 401 and onto the second substrate 201. Increased selective reflection by the coated article 102 may also reduce transfer of heat across the double-pane window 100 into the enclosure or building. The coated article 102 may inherently transmit some solar radiation with visible wavelengths. In some embodiments, the coated article 102 transmits ≥30% of visible light wavelengths (e.g., about 400 nm to about 700 nm) from outside solar radiation, or ≥35%, or ≥40%, or ≥45%, or ≥50%, or ≥55%, or ≥60%, or ≥65%, or ≥70%, or ≥75%, or ≥85%, or ≥90%, or ≥91%, or ≥92%, or ≥93%, or ≥94%, or ≥95%, or ≥96%, or ≥97%, or ≥98%, or even ≥99% visible wavelength transmission (Tvis), including all ranges and subranges therebetween.

In some embodiments, the coated article 102 is highly transmissive for actinic wavelengths α. In some embodiments, actinic wavelengths α are from about 320 nm to about 700 nm, or from about 320 nm to about 420 nm, or even from about 350 to about 420 nm. Example actinic wavelengths α include about 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, or 700 nm, including all ranges and subranges there between.

Figure 4:
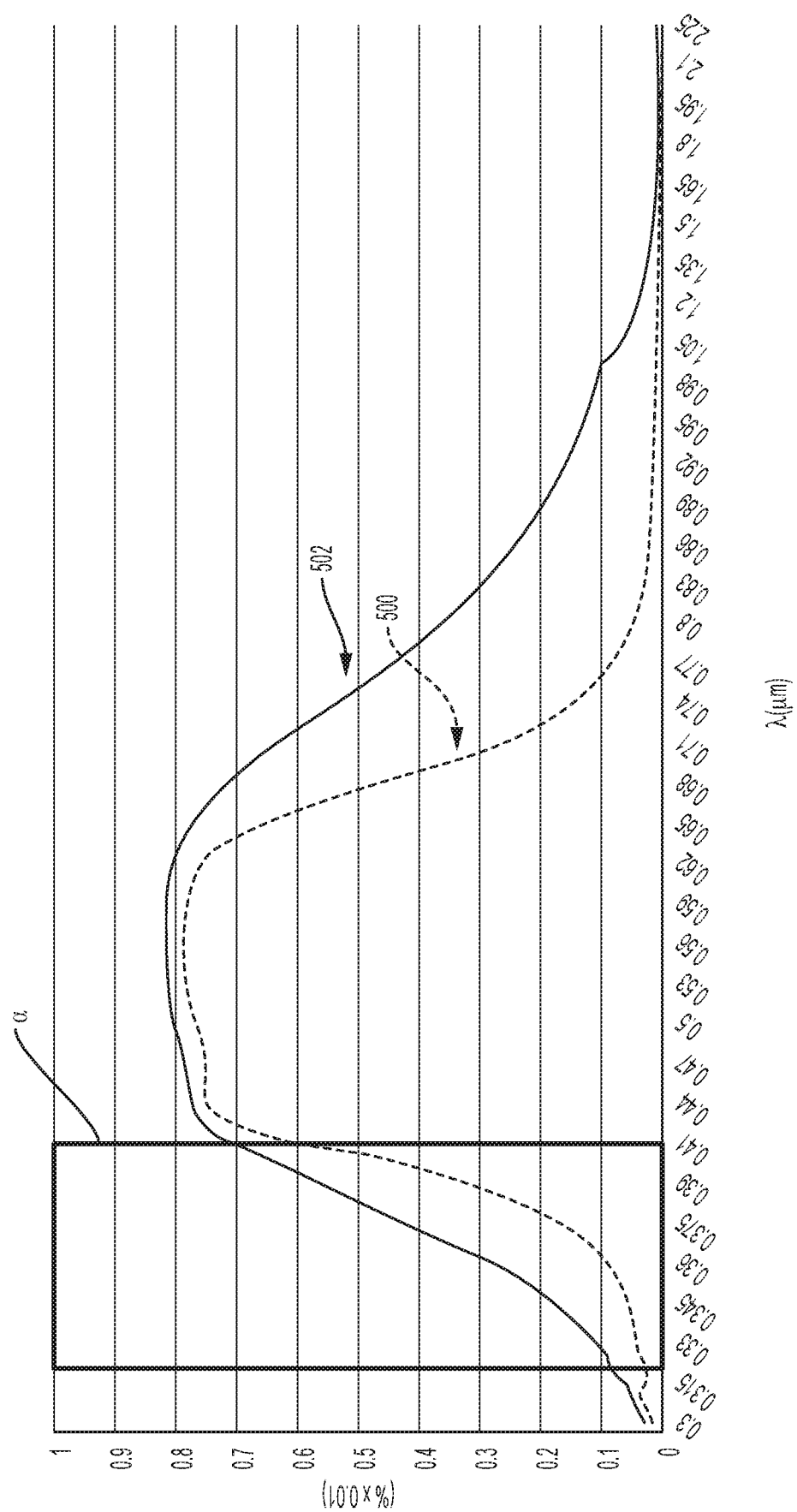
FIG. 4 illustrates the transmission spectra of two conventional low emissivity coatings.

FIG. 4 illustrates the approximate transmission spectra of two example known low emissivity coatings (e.g., a first known low emissivity coating and a second known low emissivity coating) are graphically illustrated by a first line 500 and a second line 502. Example actinic wavelengths α are illustrated in FIG. 4. Conventional low emissivity coatings or layers (including those illustrated by the first line 500 and the second line 502) do not transmit a sufficient portion of long UV wavelengths and/or actinic wavelengths α from the solar spectrum. That is, architectural windows may require increased transmission of UV wavelengths and/or actinic wavelengths α from the solar spectrum in certain applications as compared to conventional low emissivity layers or coatings. The first low emissivity coating, represented by the first line 500, has three metal layers including silver, while the second low emissivity coating, represented by the second line 502, has two metal layers including silver. As shown in FIG. 4, the first low emissivity coating (represented by the first line 500) transmits from about 48% to about 52% of short visible wavelengths (e.g., from about 400 nm to about 420 nm). The first low emissivity coating (represented by the first line 500) also transmits from about 5% to about 48%% of long UV wavelengths (e.g., from about 320 nm to about 400 nm). As shown in FIG. 4, the second low emissivity coating (represented by the second line 502) transmits from about 65% to about 69% of short visible wavelengths (e.g., from about 400 nm to about 420 nm). The second low emissivity coating (represented by the second line 502) also transmits from about 10% to about 65%% of long UV wavelengths (e.g., from about 320 nm to about 400 nm). These and other conventional low emissivity coatings do not transmit a sufficient portion of long UV wavelengths, short visible wavelengths, and/or actinic wavelengths α from the solar spectrum.

Each of the conventional low emissivity coatings illustrated in FIG. 4, for example, block a significant portion of wavelengths above about 700 nm, which corresponds to the start of the near-IR band. More particularly, at wavelengths above approximately 700 nm, the low emissivity coatings represented by the lines 500 and 502 are less than about 70% and less than about 40% transmissive, respectively. Above approximately 2000 nm, both conventional low emissivity coatings represented by the lines 500 and 502 are substantially non-transmissive (e.g., ≤1% transmission).

Referring now to FIGS. 1-4, in particular embodiments, heat transfer through coated article 102 can be sufficiently minimized by ensuring that the low emissivity coating 103 according to the present disclosure, which are described in further detail below, transmit less than 10% of wavelengths from about 751 nm to about 2000 nm, or from about 800 nm to about 2000 nm, or from about 900 nm to about 2000 nm, or even from about 1000 nm to about 2000 nm or more.

Figure 5:
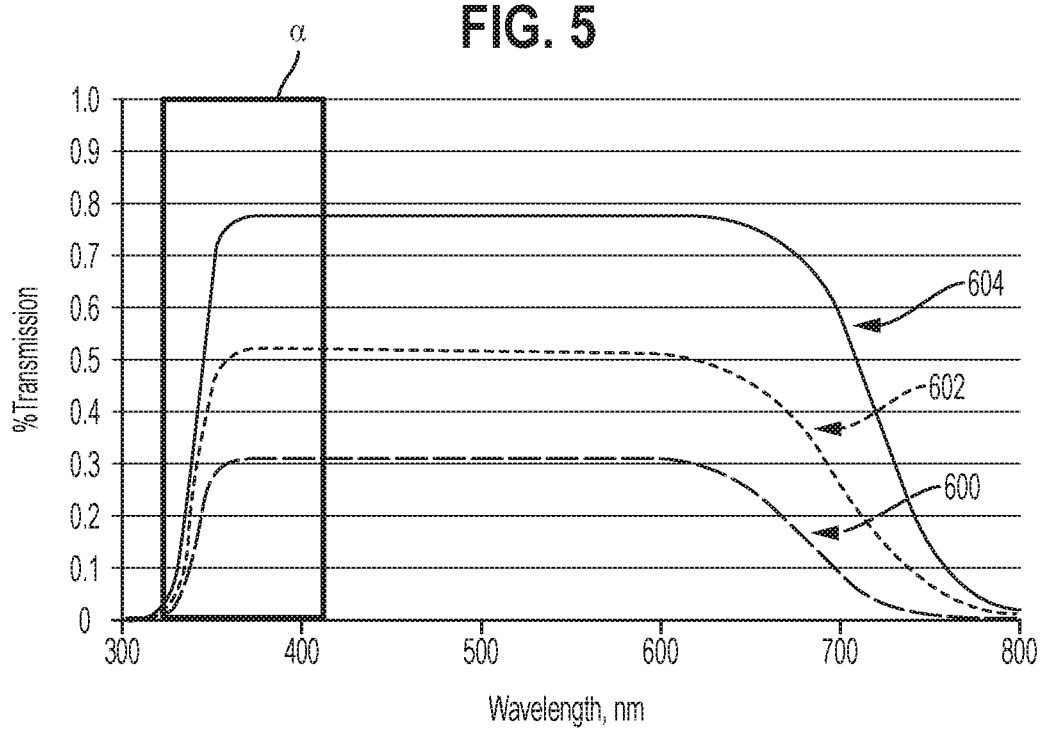
FIG. 5 illustrates the transmission spectra of low emissivity coatings according to exemplary embodiments.

In some embodiments, the coated article 102 (including the low emissivity coating 103 thereon), or the low emissivity coating 103 alone, transmits increased long UV wavelengths. In some embodiments, the coated article 102 (including low emissivity coating 103 thereon), or low emissivity coating 103 alone, transmits increased short visible wavelengths. In some embodiments, the coated article 102 (including the low emissivity coating 103 thereon), or the low emissivity coating 103 alone, transmits increased actinic wavelengths α from the solar spectrum. In some embodiments, actinic wavelength α absorption and/or reflection by substrate 101 may be negligible. That is, low emissivity coating 103 may control the desired spectral selectivity of coated article 102. FIG. 5 illustrates three approximate transmission spectra (i.e., lines 600, 602, and 604) as example embodiments of low emissivity coating 103 according to the present disclosure. Actinic wavelengths α are also illustrated in FIG. 5. In some embodiments, the low emissivity coating 103 has a transmission spectra substantially similar to lines 600, 602, and 604, or a combination of transmission spectral trends between any combination of lines 600, 602, and 604.

In some embodiments, the coated article 102 has a front emissivity fraction (contiguous or emanating from the surface 104) of from about 0.75 to about 0.99, or from about 0.80 to about 0.9, or from about 0.82 to about 0.89, such as 0.70, 0.75, 0.80, 0.85, 0.90, 0.95, 0.99, including all ranges and subranges therebetween. In some embodiments, the coated article 102 has a back emissivity fraction (contiguous or emanating from the surface 106) of from about 0.01 to about 0.1, or from about 0.02 to about 0.03, or from about 0.022 to about 0.29, such as 0.01, 0.015, 0.02, 0.025, 0.03, 0.035, 0.04, including all ranges and subranges therebetween. In some embodiments, the coated article 102 has a visible wavelength reflection (Rvis) fraction less than 0.1, or from about 0.01 to about 0.1, or from about 0.05 at about 0.09, such as 0.01, 0.05, 0.1, 0.15, 0.2 or more, including all ranges and subranges therebetween.

In some embodiments, the coated article 102 has a solar heating transmission (Tsol) fraction of less than 0.5, even from about 0.01 to about 0.5, or from about 0.2 to about 0.5, or from about 0.35 to about 0.45, such as 0.01, 0.05, 0.1, 0.25, 0.3, 0.35, 0.4, 0.45, or 0.5 or more, including all ranges and subranges therebetween. In some embodiments, the coated article 102 has a solar heating reflection (Rsol) fraction of greater than or equal to 0.1, greater than or equal to 0.2, greater than or equal to 0.3, greater than or equal to 0.4, greater than or equal to 0.5, greater than or equal to 0.6 or more, such as 0.1, 0.2, 0.3, 0.4, 0.5, 0.6 or more, including all ranges and subranges therebetween. In some embodiments, the reflective, absorptive, and transmissive properties of coated article 102 are independent of the angle of solar radiation contacting the coated article 102. In some embodiments, the dependence of reflective, absorptive, and transmissive properties of the coated article 102 based on the angle of solar radiation contacting the coated article 102 is minimized to the extent possible.

In some embodiments, the low emissivity coating 103 may be a doped metal oxide coating including a host lattice and at least one of a metal or a halide. In some embodiments, the host lattice may include indium oxide ($In_2O_3$), tin oxide ($SnO_2$), zinc oxide (ZnO), silicon oxide ($SiO_2$), aluminum oxide ($Al_2O_3$), zirconium oxide (ZrO); zinc oxide (ZnO), titanium oxide ($TiO_2$), tin oxide ($SnO_2$), bismuth oxide ($B_2O_3$); indium tin oxide (ITO), and combinations thereof. In some embodiments, the metal within the host lattice may be aluminum, gallium, molybdenum, tungsten, niobium, bismuth, indium, copper, iron, tin, gold, lead, silver, titanium, zirconium, zinc, or combinations thereof. In some embodiments, the halide within the host lattice may be fluoride, chloride, bromide, iodide, astatine, or combinations thereof. Any combination of the host lattice oxides and the metal and/or halide are in accordance with the present disclosure. In some embodiments, the host lattice is doped with a metal, a halide, or combinations thereof.

The combination of a host lattice and a metal and/or a halide is often abbreviated as "[host metal]:[metal]" or "[host metal]:[halide]" or "[host metal]:[(metal, halide)]". For example, doped metal oxide coatings of the present disclosure may include ITO:Ti; $In_2O_3$:Ti; TiO:Al; $In_2O_3$:Mo; $In_2O_3$:Ga; $In_2O_3$:W; $In_2O_3$:Zr; $In_2O_3$:Nb; $In_2O_3$:F; $Sn_2O$:F; ZnO:(Al, F); ZnO:B; ZnO:Ga; or ZnO:(Ga, B). Doped metal oxide coatings of the present disclosure may also include ITO:ZnO; $In_2O_3$—ZnO (IZO); $In_{2-2x}M_xSn_xO_3$ where M is Zn or Cu; $Zn_{0.9}Mg_{0.1}O$:Ga. The degree of doping may determine the transmissive wavelengths.

The optical and electrical properties of the disclosed doped metal oxides are not independent of each other. Instead they are linked physically and can be described by the Drude Model which explains the thermal, electrical and optical properties of metals based on the movement of both free and bound electrons. Increased doping of a metal and/or a halide in the host metal increases free electrons leading to higher conductivity. Higher doping also increases the optical band gap due to Burstein-Moss effect, improving UV transmission. However, increasing doping also may increase the absorption in the IR wavelength spectrum as the wavelength of the plasma frequency decreases. The UV transmission of a single layer doped metal oxide low emissivity coating is also impacted by interference fringes arising from the thickness and index of the coating and the substrate. Low emissivity coatings 103 of the present disclosure (for example, doped metal oxide low emissivity coatings) may have a thickness T1 from about 100 nm to about 1500 nm, or from about 200 nm to about 1000 nm, or even from about 250 nm to about 600 nm, such as 50, 100, 150, 200, 250, 300, 350, 400, 450, 500, 550, 600, 650, 700, 750, 800, 900, 1000, 1050, 1100, 1150, 1200, 1250, 1300, 1350, 1400, 1450, 1500 nm or more, including all ranges and subranges therebetween.

For example, the low emissivity coating 103 can be formed by the sputtering of doped zinc oxide layers by the method described in patent publication no. EP2904128. An example low emissivity coating 103 with an emissivity fraction of approximately 0.08 can be formed by depositing an about 1050 nm thick layer of zinc oxide doped with 0.5 weight percent (wt. %) aluminum on a substrate 101. This example provides about 75% transmission of wavelengths at about 375 nm. In another example, a low emissivity coating 103 can be formed by sputtering an about 400 nm thick layer of zinc oxide doped with 2 wt. % aluminum. This example provides about 44% transmission of wavelengths at about 375 nm. Thus, the thickness and doping level of a doped metal oxide layer in low emissivity coating 103 has an effect on the transmission of long UV wavelengths and short visible wavelengths.

Low emissivity coating 103 may also be a layered stack including at least one metal or reflecting layer. That is, low emissivity coating 103 may be formed from a plurality of individual layers stacked together. The basic structure may be a repeating $\lambda$-(dielectric layer-reflecting layer-dielectric layer-reflecting layer-dielectric layer)-$\lambda$ pattern deposited on the first substrate 101 with one or more optional layers and/or separating layers therebetween at select locations. Each metal and/or dielectric may be comprised of a plurality of layers to improve performance. Low emissivity coating 103 does not include a UV reflective or absorption layer used in some conventional low emissivity stacks.

The one or more optional layers may include a conducting layer, a barrier layer, an adhesion promoting layer, a seed layer, an absorbing layer, a sacrificial layer, a durability layer, and/or scratch resistant layer. Said optional layers may be optically transparent. These optional layers may improve low emissivity coating 103 performance, manufacturability, manufacturing yield, durability, or color. A doped metal oxide layer may be used in place of or in addition to a metal oxide layer in order to reduce emissivity for IR wavelengths.

Absorbing layers may optionally be included to tune the color of the coating stack. Adhesion promoting layers may optionally be included to ensure good adhesion and uniform nucleation of a metal layer. Scratch resistant layer may optionally be included to prevent damage during the coating and assembly process.

The metal layer or layers may include silver, gold, copper, aluminum, nickel, combinations thereof, and alloys thereof. Combinations of said metals may be in a single layer or a combination of metal layers. The metal layer may include a metallic barrier layer which prevents oxidation of the high conductivity metals during the dielectric layer deposition process. Metal layer(s) in a layer stack that form the low emissivity coating 103 may be reflective to IR and NIR wavelengths as described above. Specifically, the metal layer(s) may reduce IR and NIR transmissivity across the coated article 102 and thus reduce heat transfer across the coated article 102. The low emissivity coating 103 may include one or more metal layers, such as 2, 3, 4, 5, or 6 metal layers. Metal layers in layered stack that form the low emissivity coating 103 may each have a thickness from about 1 nm to about 50 nm, or from about 4 nm to about 10 nm, or even from about 5 nm to about 10 nm. In some embodiments, metal layer thicknesses are thin enough (e.g., ≤20 nm, or even ≤5 nm) to allow for high Tvis, yet thick enough (e.g., ≥5 nm, or even ≥20 nm) to allow for high IR and NIR reflection.

Metal layers within the low emissivity coating 103 may be separated by dielectric layers which include any combination of optional layers therebetween including an inorganic dielectric layer, a durability layer, an absorbing layer, an adhesion promoting layer, a doped metal oxide layer, and/or a barrier layer. In some embodiments, two or more different metal layers may be in contract with each other within the low emissivity coating 103. In some embodiments, at least one dielectric layers is disposed on opposite sides of the at least one metal layer.

A dielectric layer on top of a metal layer may shift the transmission peak from UV wavelengths to longer wavelength in the visible. A dielectric layer under or beneath a metal layer may act as an anti-reflective layer improving transmission in the visible. In some embodiments, dielectric layers include materials with high refractive indices. In some embodiments, dielectric layers include an oxide, a nitride, an oxy-nitride, and combinations thereof. In some embodiments, the dielectric layers may be in a stoichiometric or a sub-stoichiometric condition. In some embodiments, dielectric layers include $TiO_2$, ZnO, ZnS, SiAlOxNy, $SnO_2$, Nb2O5, SiNx, $ZnSnO_3$, $Bi_2O_3$, $In_2O_3$, $Nb_2O_5$, and combinations thereof. In some embodiments, the dielectric layers may be sputtered in a gas including oxygen and/or nitrogen such that dielectric layer precursors may reach their oxidized, nitride, or oxy-nitride states.

Increasing long UV or actinic transmission of a single metal layer containing low emissivity coating may be achieved by using dielectric layers with high index and optical band gap. Increasing long UV or actinic transmission may be accomplished using a two or more metal layer design. For example, separating the two or more metal layers into two layers with a dielectric between them allows one to broaden the reflectivity response of the coating and potentially improve long UV and/or actinic transmission.

In some embodiments, a layered stack forming the low emissivity coating 103 may include one or more optional seed layers. In some embodiments, the seed layer may be provided between a metal layer and a dielectric layer. The seed layer may be used to improve the optical properties of the low emissivity coating 103. In some embodiments, the seed layer is optically neutral. In some embodiments, the seed layer is provided on a layer to enhance uniformity of the coating surface on the first substrate 101 before a metal layer (e.g., a metal layer of the low emissivity coating 103) is applied. In some embodiments, the seed layer prevents oxidation of an underlying metal layer and/or ensures uniform dense nucleation. In some embodiments, the seed layer thickness is from about 1 nm to about 6 nm, or about 1 nm to about 5 nm. In some embodiments, seed layer may include ZnO, ZnAlOx, or combinations thereof.

In some embodiments, the layered stack forming the low emissivity coating 103 may include one or more optional sacrificial layers. In some embodiments, the sacrificial layer may be provided between a metal layer and a dielectric layer. The sacrificial layer may be used to improve protect a metal layer before another layer is added to the coating. In some embodiments, the sacrificial layer is optically neutral. In some embodiments, the sacrificial layer is provided on a metal layer in the coating to enhance uniformity of the coating surface on the first substrate 101 or to protect a metal layer before another layer is applied. For example, sacrificial layer may protect a metal layer from being oxidized or reduced based on the composition of a subsequent layer to be applied. In some embodiments, sacrificial layer may include $TiO_2$.

In some embodiments, the layered stack forming the low emissivity coating 103 may also include one or more optional durability layers. In some embodiments, the durability layer is provided as the last or top layer of the low emissivity coating 103, opposite the first substrate 101. That is, the durability layer is only in contact with one other layer in the low emissivity coating 103. The durability layer may be exposed to contact with internal or external elements depending on the location of the coated article 102. In some embodiments, the durability layer has properties which are scratch resistance, anti-microbial, resistant to corrosion, wear resistant, oxidation resistant, adhesion resistant, non-wetting, or combinations thereof. In some embodiments, the durability layer includes C, graphene, SiSn, ZrSi, $SiSnO_2$, a silicide, DLC, $ZrO_2$, SiNx, and combinations thereof.

In some embodiments, the layered stack forming the low emissivity coating 103 may also include one or more optional absorbing layers. The absorbing material of the absorbing layers may allow for control of the transmittance color, or specific visible wavelengths, such that the low emissivity coating 103 has a desired color. In some embodiments, the absorbing layer is provided between a barrier layer protecting a metal layer and an overlying dielectric layer. In some embodiments, the absorbing layer includes a metal, an alloy, a silicide, an absorbing oxide, an absorbing grey metal, a nitride, combinations thereof, or any other suitable material that achieves the desired effect. In some embodiments, the absorbing layer includes Ti, TiN, Si, NiCr, NiCrOx, Cr, Zr, Mo, W, ZrSi, nickel or chromium alloys, transition metals, nitrides, silicates, aluminates, and combinations thereof. In some embodiments, the absorbing layer may be sputtered in argon.

In some embodiments, the layered stack forming the low emissivity coating 103 may also include one or more optional barrier layers. In some embodiments, a barrier layer (whether a separate layer or an absorbing layer) protects the metal layer against degradation or attack when the sputtering another layer (e.g., a dielectric layer) on top thereof. In some embodiments, the barrier layer improves the chemical and/or physical durability of low emissivity coating 103 by controlling the diffusion of aggressive elements and compounds (e.g., $O^{-2}$, $O_2$, $H_2O$, $Na^+$, etc.). In some embodiments, the barrier layer is substantially transparent to visible wavelengths and actinic wavelengths α. In some embodiments, the barrier layer can include NiCr, $NiCrO_x$, $TiO_x$, $Si_3N_4$, $NiCrN_xO_y$, $NiCrN_x$, Ti, NiCrMo, NiCrMoOx, and combinations thereof.

about 30 nm, or even from about 10 nm to about 40 nm. In exemplary embodiments, the layered stack forming the low emissivity coating 103 has a total thickness T1 (i.e., a sum of all the discrete layers together) from about 1 nm to about 250 nm, or from about 10 nm to about 150 nm, or even from about 100 nm to about 500 nm.

In some embodiments, the layered stack forming the low emissivity coating 103 has a neutral color (a* and b* negative and well balanced). In some embodiments, the minimum requirement for a negative a* value and a negative b* value is a value less than +2 for transmittance and glass side reflectance. A neutral color or transmittance may be desirable as it maximizes the correct color rendering from one surface of the coated article 102 to the opposite surface. In some embodiments, the coated article 102 has a neutral color. In some embodiments, coated article 102 has a neutral grey color.

EXAMPLES

The present disclosure will be further clarified with reference to the following examples which are intended to be non-restrictive and illustrative only.

Prophetic Example 1

Figure 6:
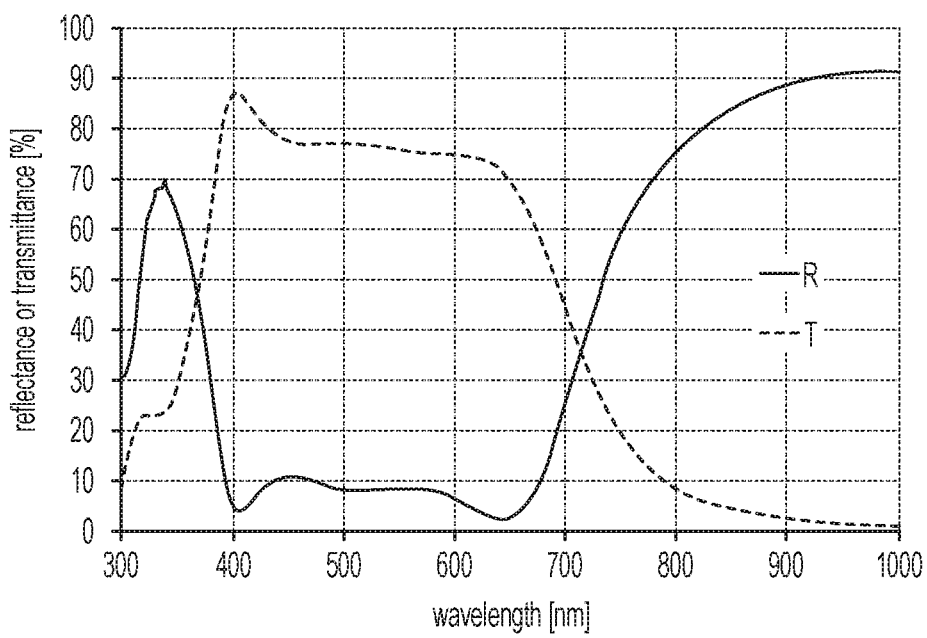
FIGS. 6-14 illustrate the modeled transmission spectra for low emissivity layers and coatings described in prophetic examples 1-9 herein.

An example of a modeled low emissivity coating is provided in Table 1 below. The modeled low emissivity coating consists of multiple layers of Ag, Ti, ZnO, and $Si_3N_4$, deposited on a glass substrate. The optical performance of the modeled low emissivity coating is provided in FIG. 6.

TABLE 1

| Design: | Broadened - Tx80 | | | | |
|---|---|---|---|---|---|
| Ref wavelength (nm) | | | 550 | | |
| Layer | Material | Packing Density | Refractive Index | Extinction Coefficient | Physical Thickness (nm) |
| Medium | Air | | 1 | 0 | |
| 1 | $Si_3N_4$ | 1 | 1.99491 | 0.00016 | 15.0 |
| 2 | ZnO | 1 | 2.01198 | 0 | 23.8 |
| 3 | Ti | 1 | 1.87412 | 3.0201 | 0.4 |
| 4 | Ag | 1 | 0.055 | 3.32 | 15.6 |
| 5 | ZnO | 1 | 2.01198 | 0 | 69.2 |
| 6 | Ti | 1 | 1.87412 | 3.0201 | 0.4 |
| 7 | Ag | 1 | 0.055 | 3.32 | 10.0 |
| 8 | ZnO | 1 | 2.01198 | 0 | 72.1 |
| 9 | Ti | 1 | 1.87412 | 3.0201 | 0.4 |
| 10 | Ag | 1 | 0.055 | 3.32 | 13.4 |
| 11 | ZnO | 1 | 2.01198 | 0 | 40.9 |
| Substrate | glass | 1 | 1.511 | | |
| Total Thickness (nm) | | | | | 261.1 |

The layered stack forming the low emissivity coatings 103 may have an average thickness from about 1 nm to about 500 nm on a surface of substrate 101. The layered stack forming the low emissivity coatings 103 may be comprised of a plurality of discrete layers together. That is, the layered stack forming the low emissivity coatings 103 may comprise any combination of the layers described herein. Individual discrete layers of the layered stack forming the low emissivity coatings 103 may have a thickness from about 1 nm to about 50 nm, or from about 5 nm to Prophetic Example 2

Relying on the scale invariance of the model equations describing the propagation and interference of light, preliminary designs that shift the spectra to shorter or longer wavelengths can be obtained by scaling the thickness of the nearly transparent (non-metals) by the ratio of the desired wavelength of operation to the original design wavelength. That is, by decreasing and increasing the thickness of ZnO and/or Si$_3$N$_4$ by 10%, the model predicts a shift of the transmission peak, respectively, to shorter wavelengths and to longer wavelengths.

Figure 7:
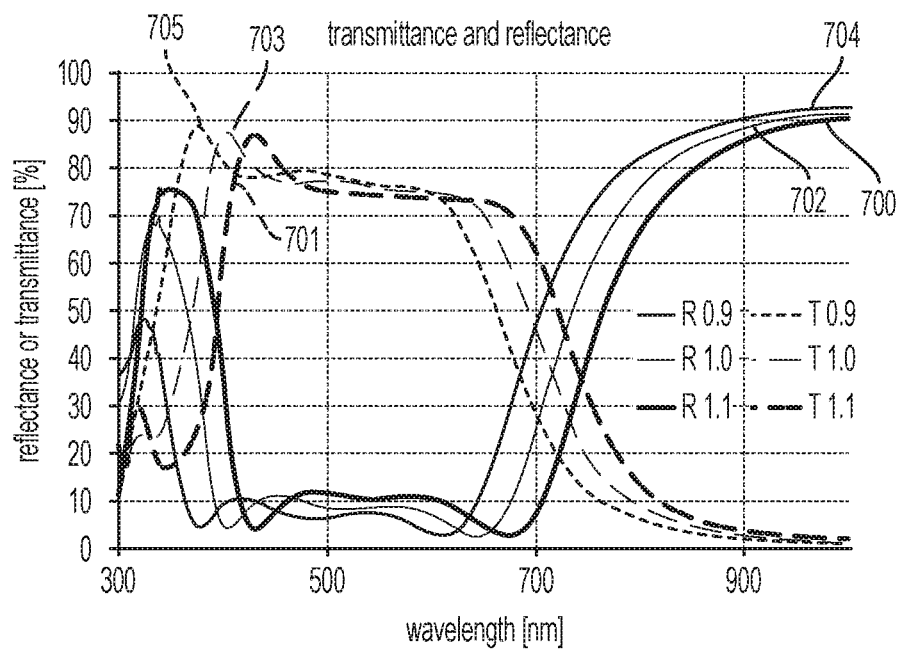

FIG. 7 graphically illustrates this shift. In particular, line 702 shows the reflectance of the design of Table 1 (without decreasing or increasing the thickness of ZnO and/or Si$_3$N$_4$) and line 703 shows the transmittance of the design of Table 1 (without decreasing or increasing the thickness of ZnO and/or Si$_3$N$_4$). Line 700 shows the reflectance of the design of Table 1 when the thickness of ZnO and/or Si$_3$N$_4$ is increased by 10% and line 701 shows the transmittance of the design of Table 1 when the thickness of ZnO and/or Si$_3$N$_4$ is increased by 10%. Line 701 shows that increasing the thickness of ZnO and/or Si$_3$N$_4$ shifts the transmission peak to longer wavelengths. Further, line 704 shows the reflectance of the design of Table 1 when the thickness of ZnO and/or Si$_3$N$_4$ is decreased by 10% and line 705 shows the transmittance of the design of Table 1 when the thickness of ZnO and/or Si$_3$N$_4$ is decreased by 10%. Line 705 shows that decreasing the thickness of ZnO and/or Si$_3$N$_4$ shifts the transmission peak to shorter wavelengths.

Prophetic Example 3

Figure 8:
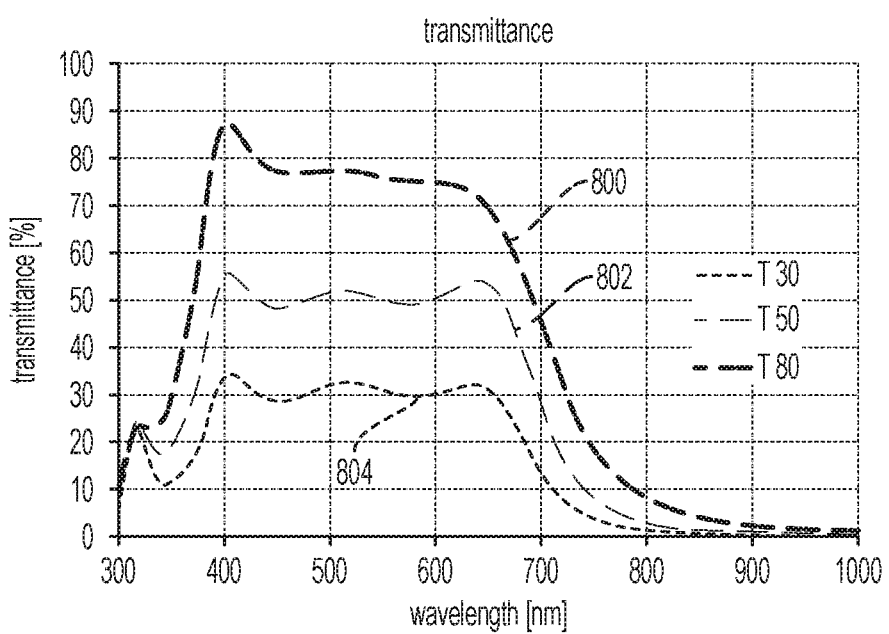

The modeled performance of the low emissivity coating in Example 1 was modified to change the level of transmittance. FIG. 8 illustrates the modeled optical transmittance of the coating detailed in Table 1 (depicted by line 800), along with two other designs that provide 30% transmission (depicted by line 804) and 50% transmission (depicted by line 802) over the visible region. This was modeled by changing the thickness of some of the coating layers. Tables 2-3 below provide the details of the modeled coatings.

TABLE 2

| Design: | Table 1 - Sample A - Broadened - Tx30 | | | |
|---|---|---|---|---|
| Reference Wavelength (nm): 550 | | | | |
| Incident Angle (deg): 2 | | | | |
| Layer | Material | Packing Density | Refractive Index | Extinction Coefficient | Physical Thickness (nm) |
|---|---|---|---|---|---|
| Medium | Air | | 1 | 0 | |
| 1 | Si$_3$N$_4$ | 1 | 1.99491 | 0.00016 | 15.0 |
| 2 | ZnO | 1 | 2.01198 | 0 | 20.9 |
| 3 | Ti | 1 | 1.87412 | 3.0201 | 0.4 |
| 4 | Ag | 1 | 0.055 | 3.32 | 13.9 |
| 5 | ZnO | 1 | 2.01198 | 0 | 64.4 |
| 6 | Ti | 1 | 1.87412 | 3.0201 | 0.4 |
| 7 | Ag | 1 | 0.055 | 3.32 | 10.0 |
| 8 | ZnO | 1 | 2.01198 | 0 | 83.3 |
| 9 | Ti | 1 | 1.87412 | 3.0201 | 0.4 |
| 10 | Ag | 1 | 0.055 | 3.32 | 33.9 |
| 11 | ZnO | 1 | 2.01198 | 0 | 46.0 |
| Substrate | glass | 1 | 1.511 | | |
| Total Thickness | | | | | 288.6 |

TABLE 3

| Design: | Table 1 - Sample A - Broadened - T 50 | | | |
|---|---|---|---|---|
| Reference Wavelength (nm): 550 | | | | |
| Incident Angle (deg): 2 | | | | |
| Layer | Material | Packing Density | Refractive Index | Extinction Coefficient | Physical Thickness (nm) |
|---|---|---|---|---|---|
| Medium | Air | | 1 | 0 | |
| 1 | Si$_3$N$_4$ | 1 | 1.99491 | 0.00016 | 15.0 |
| 2 | ZnO | 1 | 2.01198 | 0 | 21.0 |
| 3 | Ti | 1 | 1.87412 | 3.0201 | 0.4 |
| 4 | Ag | 1 | 0.055 | 3.32 | 14.3 |
| 5 | ZnO | 1 | 2.01198 | 0 | 64.2 |
| 6 | Ti | 1 | 1.87412 | 3.0201 | 0.4 |
| 7 | Ag | 1 | 0.055 | 3.32 | 10.0 |
| 8 | ZnO | 1 | 2.01198 | 0 | 82.9 |
| 9 | Ti | 1 | 1.87412 | 3.0201 | 0.4 |
| 10 | Ag | 1 | 0.055 | 3.32 | 24.6 |
| 11 | ZnO | 1 | 2.01198 | 0 | 42.6 |
| Substrate | glass | 1 | 1.511 | | |
| Total Thickness | | | | | 275.8 |

Prophetic Example 4

Figure 9:
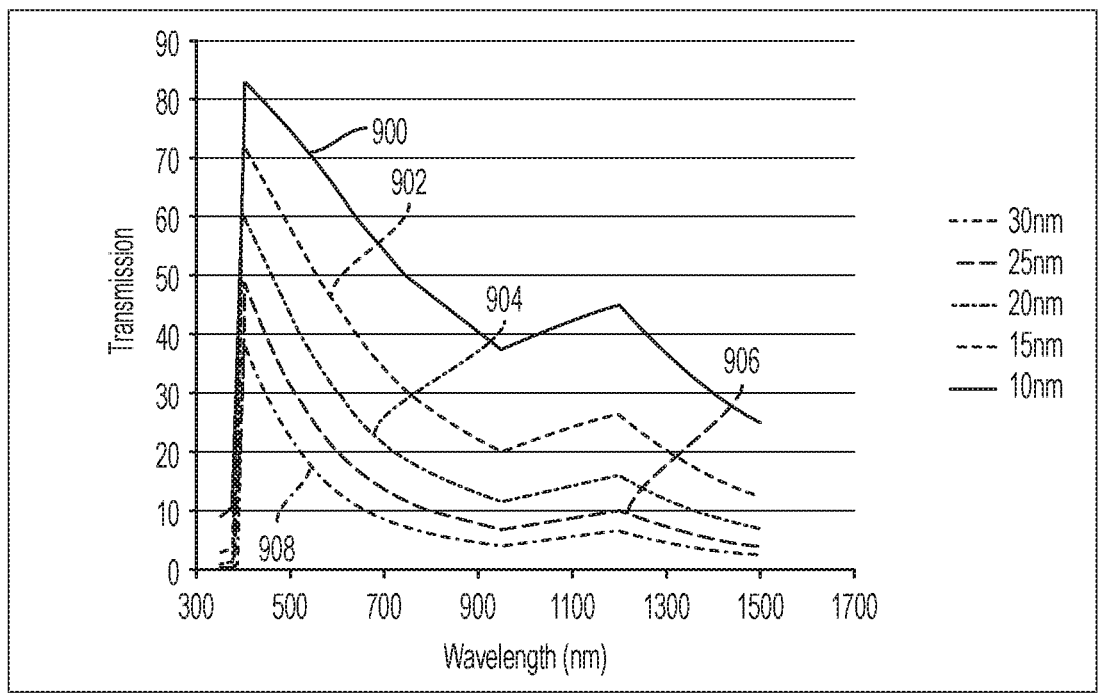

FIG. 9 illustrates the modeled optical transmittance of the various Ag layers. In particular, FIG. 9 graphically illustrates the transmission spectra for 10 nm (line 900), 15 nm (line 902), 20 nm (line 904), 25 nm (line 906), and 30 nm (line 908) thickness of Ag layer on glass.

Prophetic Example 5

Figure 10:
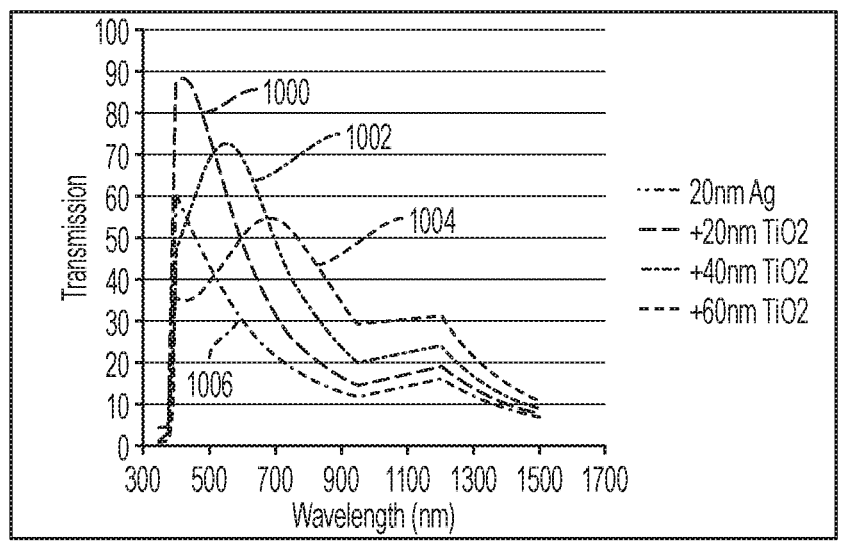

The transmission spectra for a 20 nm thickness of Ag layer on glass was modeled with a 20 nm, 40 nm, and 60 nm thickness layer of $TiO_2$ thereon. FIG. 10 illustrates the modeled optical transmittance the 20 nm thickness of Ag layer on glass of the various coatings. In particular, line 1006 shows the modeled optical transmittance of the 20 nm thickness of Ag layer on glass, line 1000 shows the modeled optical transmittance of the 20 nm thickness of Ag layer on glass with a 20 nm thickness layer of $TiO_2$ thereon, line 1002 shows the modeled optical transmittance of the 20 nm thickness of Ag layer on glass with a 40 nm thickness layer of $TiO_2$ thereon, and line 1004 shows the modeled optical transmittance of the 20 nm thickness of Ag layer on glass with a 60 nm thickness layer of $TiO_2$ thereon.

Prophetic Example 6

Figure 11:
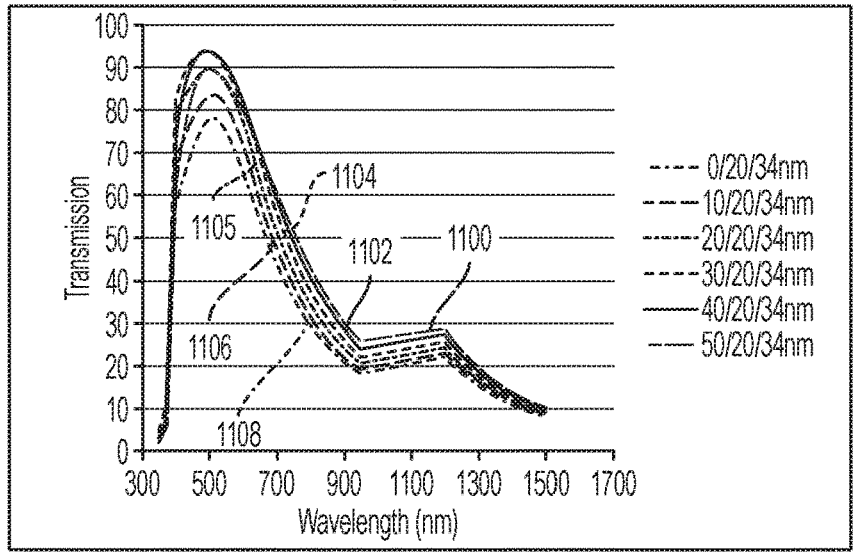

The transmission spectra for glass with a 20 nm Ag layer thereon, and a 34 nm $TiO_2$ layer on said Ag layer was modeled and is graphically depicted in FIG. 11. Further, the transmission spectra for a 10 nm, 20 nm, 30 nm, 40 nm, and 50 nm $TiO_2$ thickness on glass with a 20 nm Ag layer thereon, and a 34 nm $TiO_2$ layer on said Ag layer was modeled and is also graphically depicted in FIG. 11. FIG. 11 illustrates the modeled optical transmittance of the various coatings. In particular, line 1100 shows the modeled optical transmittance for the 50 nm $TiO_2$ thickness on glass with a 20 nm Ag layer thereon, and a 34 nm $TiO_2$ layer on said Ag layer, line 1102 shows the modeled optical transmittance for the 40 nm $TiO_2$ thickness on glass with a 20 nm Ag layer thereon, and a 34 nm $TiO_2$ layer on said Ag layer, line 1104 shows the modeled optical transmittance for the 30 nm $TiO_2$ thickness on glass with a 20 nm Ag layer thereon, and a 34 nm $TiO_2$ layer on said Ag layer, line 1105 shows the modeled optical transmittance for the 20 nm $TiO_2$ thickness on glass with a 20 nm Ag layer thereon, and a 34 nm $TiO_2$ layer on said Ag layer, line 1106 shows the modeled optical transmittance for the 10 nm $TiO_2$ thickness on glass with a 20 nm Ag layer thereon, and a 34 nm $TiO_2$ layer on said Ag layer, and line 1108 shows the modeled optical transmittance for glass with a 20 nm Ag layer thereon, and a 34 nm $TiO_2$ layer on said Ag layer.

Prophetic Example 7

Figure 12:
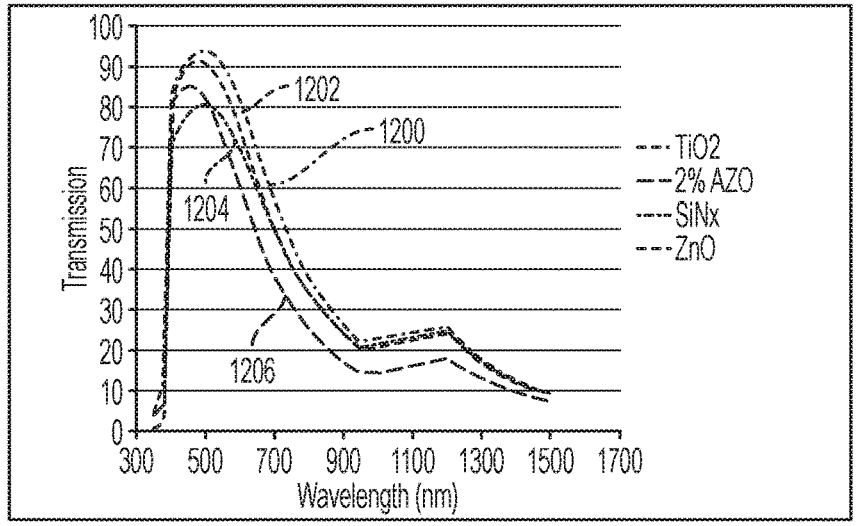

The transmission spectra of a dielectric layer-Ag layer-dielectric layer configuration with $TiO_2$, 2% AZO, SiNx, or undoped ZnO dielectrics of equivalent optical path length configuration was modeled. FIG. 12 illustrates the modeled optical transmittance of the various coatings. In particular, line 1200 shows the modeled optical transmittance of the a dielectric layer-Ag layer-dielectric layer configuration with $TiO_2$, line 1202 shows the modeled optical transmittance of the a dielectric layer-Ag layer-dielectric layer configuration with undoped ZnO dielectrics, line 1204 shows the modeled optical transmittance of the a dielectric layer-Ag layer-dielectric layer configuration with SiNx, and line 1206 shows the modeled optical transmittance of the a dielectric layer-Ag layer-dielectric layer configuration with 2% AZO.

Prophetic Example 8

Figure 13:
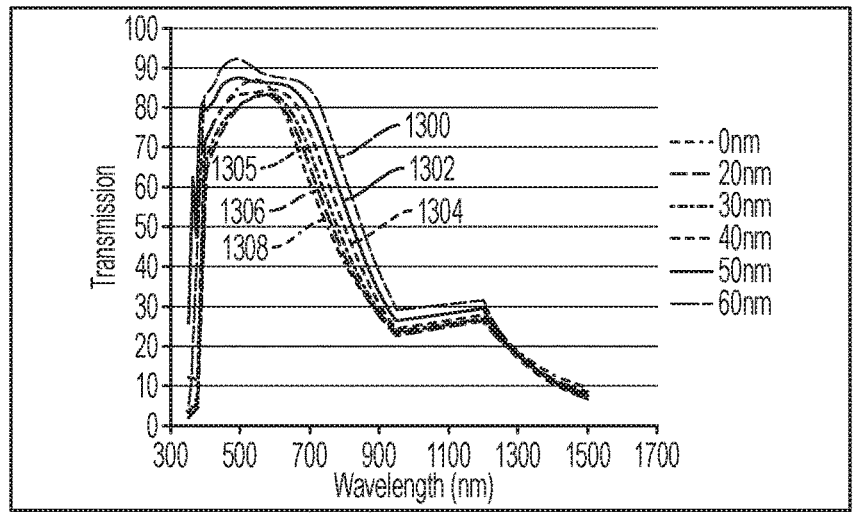

The transmission spectra for dielectric layer 1-Ag layer-dielectric layer-Ag layer-dielectric layer 3 structures were modeled. First dielectric thickness was fixed at 25 nm, third layer dielectric thickness was fixed at 40 nm, and middle dielectric thickness was varied from 0 to 60 nm. The model included two 6.7 nm Ag metal layers. FIG. 13 illustrates the modeled optical transmittance of the various coatings. In particular, line 1300 shows the modeled optical transmittance for the a dielectric layer 1-Ag layer-dielectric layer-Ag layer-dielectric layer 3 structure, where the middle dielectric thickness is 60 nm, line 1302 shows the modeled optical transmittance for the a dielectric layer 1-Ag layer-dielectric layer-Ag layer-dielectric layer 3 structure, where the middle dielectric thickness is 50 nm, line 1304 shows the modeled optical transmittance for the a dielectric layer 1-Ag layer-dielectric layer-Ag layer-dielectric layer 3 structure, where the middle dielectric thickness is 40 nm, line 1305 shows the modeled optical transmittance for the a dielectric layer 1-Ag layer-dielectric layer-Ag layer-dielectric layer 3 structure, where the middle dielectric thickness is 30 nm, line 1306 shows the modeled optical transmittance for the a dielectric layer 1-Ag layer-dielectric layer-Ag layer-dielectric layer 3 structure, where the middle dielectric thickness is 20 nm, and line 1308 shows the modeled optical transmittance for the a dielectric layer 1-Ag layer-Ag layer-dielectric layer 3 structure (e.g., a structure without the middle dielectric layer).

Prophetic Example 9

Figure 14:
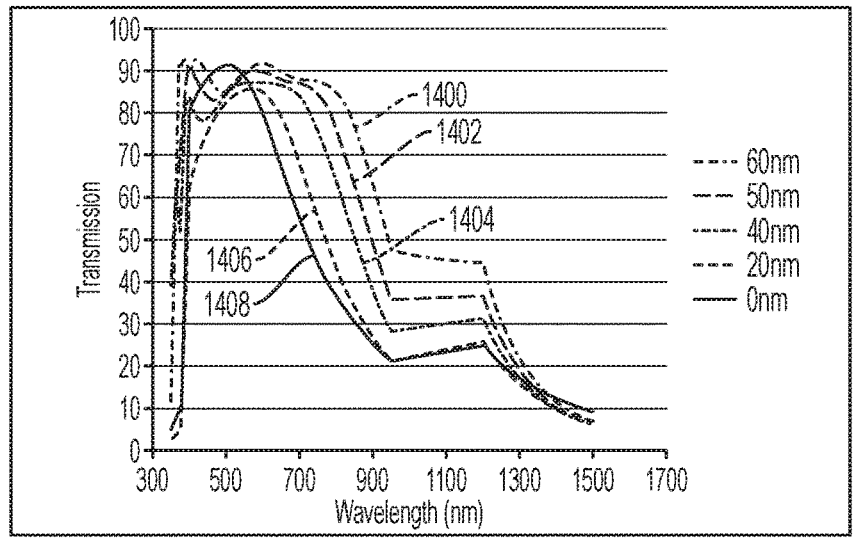

The transmission spectra for dielectric layer 1-Ag layer-dielectric layer 2-Ag layer-dielectric layer 3-Ag layer-dielectric layer 4 structures were modeled. $TiO_2$ was the dielectric layers with three 6.7 nm Ag metal layers. First dielectric thickness was fixed at 25 nm, and the fourth dielectric layer was fixed at 35 nm. The second and third layer dielectric layers are stepped between 0 and 60 nm thickness. FIG. 14 illustrates the modeled optical transmittance of the various coatings. In particular, line 1400 shows the modeled optical transmission for dielectric layer 1-Ag layer-dielectric layer 2-Ag layer-dielectric layer 3-Ag layer-dielectric layer 4 structures having 60 nm second and third layer dielectric layers, line 1402 shows the modeled optical transmission for dielectric layer 1-Ag layer-dielectric layer 2-Ag layer-dielectric layer 3-Ag layer-dielectric layer 4 structures having 50 nm second and third layer dielectric layers, line 1404 shows the modeled optical transmission for dielectric layer 1-Ag layer-dielectric layer 2-Ag layer-dielectric layer 3-Ag layer-dielectric layer 4 structures having 40 nm second and third layer dielectric layers, line 1406 shows the modeled optical transmission for dielectric layer 1-Ag layer-dielectric layer 2-Ag layer-dielectric layer 3-Ag layer-dielectric layer 4 structures having 20 nm second and third layer dielectric layers, and line 1406 shows the modeled optical transmission for dielectric layer 1-Ag layer-dielectric layer 2-Ag layer-dielectric layer 3-Ag layer-dielectric layer 4 structures that do not include the second or third layer dielectric layers (e.g., a dielectric layer 1-Ag layer-Ag layer-Ag layer-dielectric layer 4 structure).

As used herein, the singular forms "a," "an," and "the" include plural referents unless the context clearly dictates otherwise. Ranges can be expressed herein as from "about"

one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the present disclosure. Since modifications combinations, sub-combinations and variations of the disclosed embodiments incorporating the spirit and substance of the disclosure may occur to persons skilled in the art, the invention should be construed to include everything within the scope of the appended claims and their equivalents.

What is claimed is:

1. A coated article comprising a low emissivity coating and a substrate, the low emissivity coating comprising:
   at least one dielectric layer; and
   at least one metal layer;
   wherein the coated article has a transmission of greater than or equal to 50% over a range of actinic wavelengths from the solar spectrum, wherein the actinic wavelengths are from 350 nm to 420 nm, and a transmission of less than or equal to 20% over a range of wavelengths from 751 nm to 2700 nm.

2. The coated article of claim 1 wherein the coated article has a transmission of from about 1% to about 20% over a range of wavelengths from 320 nm to 350 nm.

3. The coated article of claim 1 wherein the coated article has a transmission of at least 70% over a range of wavelengths from 350 nm to 420 nm from the solar spectrum.

4. The coated article of claim 1 wherein the substrate comprises a glass, a ceramic, or a glass ceramic.

5. The coated article of claim 1 wherein the substrate and low emissivity coating are a neutral color or substantially colorless.

6. The coated article of claim 1 wherein the low-emissivity coating comprises at least two metal layers.

7. The coated article of claim 6 wherein the at least two metal layers are separated by the at least one dielectric layer.

8. The coated article of claim 1 wherein the at least one metal layer and the at least one dielectric layer are separated by an optional layer.

* * * * *